United States Patent
Alfieri et al.

(10) Patent No.: US 7,631,152 B1
(45) Date of Patent: Dec. 8, 2009

(54) DETERMINING MEMORY FLUSH STATES FOR SELECTIVE HETEROGENEOUS MEMORY FLUSHES

(75) Inventors: Robert A. Alfieri, Chapel Hill, NC (US); Michael Woodmansee, Lighthouse Point, FL (US)

(73) Assignee: NVIDIA Corporation, Santa Clara, CA (US)

(*) Notice: Subject to any disclaimer, the term of this patent is extended or adjusted under 35 U.S.C. 154(b) by 200 days.

(21) Appl. No.: 11/422,310

(22) Filed: Jun. 5, 2006

Related U.S. Application Data

(60) Provisional application No. 60/740,336, filed on Nov. 28, 2005.

(51) Int. Cl.
*G06F 13/00* (2006.01)
(52) U.S. Cl. .............. 711/154; 711/155; 711/156; 711/5; 711/159; 345/530
(58) Field of Classification Search .......... 345/502, 345/530, 531, 532; 711/154, 155, 156, 5, 711/159
See application file for complete search history.

(56) References Cited

U.S. PATENT DOCUMENTS

| | | | |
|---|---|---|---|
| 5,408,636 A * | 4/1995 | Santeler et al. ............ 711/163 |
| 6,205,521 B1 * | 3/2001 | Schumann ................ 711/144 |
| 6,513,090 B1 * | 1/2003 | Jeddeloh ................... 710/310 |
| 7,139,003 B1 * | 11/2006 | Kirk et al. ................ 345/531 |
| 2003/0123074 A1 * | 7/2003 | Imai et al. ................ 358/1.9 |
| 2003/0135687 A1 * | 7/2003 | Owens et al. ............. 711/103 |
| 2003/0151134 A1 * | 8/2003 | Nishizawa et al. ........ 257/723 |
| 2006/0090051 A1 * | 4/2006 | Speier et al. .............. 711/163 |
| 2006/0179262 A1 * | 8/2006 | Brittain et al. ............ 711/169 |
| 2007/0220276 A1 * | 9/2007 | Croxford et al. .......... 713/193 |

* cited by examiner

*Primary Examiner*—Hong Kim
(74) *Attorney, Agent, or Firm*—Patterson & Sheridan, LLP

(57) ABSTRACT

A memory flush is processed in accordance with a state machine that keeps track of the flush states of a memory target. A memory target is not flushed if it has not been written to, or if a memory flush has already been completed for that memory target. A memory target is flushed if the memory partition is in a flush needed state or a flush pending state. Each memory target has an associated state machine, but only one state machine is maintained per memory target.

19 Claims, 6 Drawing Sheets

DETERMINING MEMORY FLUSH STATES FOR SELECTIVE HETEROGENEOUS MEMORY FLUSHES

CROSS-REFERENCE TO RELATED APPLICATION

This application claims benefit of U.S. provisional patent application Ser. No. 60/740,336, filed Nov. 28, 2005, which is herein incorporated by reference.

BACKGROUND OF THE INVENTION

1. Field of the Invention

Embodiments of the present invention relate generally to memory flush and more specifically to memory flush applicable to multiple memory targets in a distributed shared memory system.

2. Description of the Related Art

In a shared memory system, memory flush is employed as a mechanism to inform processes that data has been completely written out to memory to ensure that subsequent read accesses of the same data by the processes will not be made while the data is being written out. A simple example of a memory flush is described below with reference to a shared memory environment illustrated in FIG. 1.

In FIG. 1, Process A issues a series of write instructions to write data to memory partitions 11-1, 11-2 of a memory unit 10 that has N partitions. The write instructions are stored in corresponding instruction queues 21-1, 21-2 of a memory controller 20, and processed in the order they were received. After the last write instruction, Process A issues a memory flush command to the memory controller 20. In response, the memory controller 20 issues flush read instructions for its memory partitions 11-1, 11-2, . . . , 11-N and stores them in the instructions queues 21-1, 21-2, . . . 21-N. A flush read instruction gets processed like a read instruction by the memory controller 20 except that a flush read does not cause data to be read from memory because a flush read includes an invalid memory address in the memory address field. When a flush read is processed, a specially tagged data, instead of data that is read from memory, is returned as the read result. The return of this specially tagged data in response to a flush read instruction following a write instruction signifies that the write to that memory partition has completed. Thus, when the flush read instructions in the instructions queues 21-1, 21-2, . . . , 21-N are processed and this specially tagged data is returned as the read result in each case, Process B is permitted to read the data in memory partitions 11-1, 11-2.

The memory flush technique described above can be applied efficiently in a homogeneous shared memory environment. However, in a heterogeneous shared memory environment or a distributed shared memory environment, the process is not as efficient because memory flushes of non-local memory partitions are much slower than memory flushes of local memory partitions. One solution would be to perform targeted memory flushes, i.e., perform a flush read of only those memory partitions that were written to, but there is significant overhead in keeping track of the memory partitions that were written to, especially in complex, distributed shared memory environments. When virtual memory is used, as often is the case, keeping track of the memory partitions that were written to becomes even more difficult. For these reasons, a memory flush technique that is efficient for use in heterogeneous shared memory environments is desirable.

SUMMARY OF THE INVENTION

The present invention provides a novel memory flush technique that can be efficiently applied in heterogeneous shared memory environments. According to various embodiments of the present invention, when a memory flush is requested by a process following a write instruction, the memory controller associated with the GPU on which the process is running issues a flush read instruction. The flush read instruction, however, may not be issued to all memory partitions. For example, the flush read instruction may not be issued to a memory partition if that memory partition has not been written to, or if a flush read has already been completed for that memory partition after a write operation. As a way to keep track of the different flush states of the memory partitions, a flush state machine is maintained for each memory partition, and a flush read instruction is issued for a memory partition in accordance with the flush state of that memory partition. If the memory partition is in an idle state, the flush read instruction is not issued. On the other hand, if the memory partition is in a flush needed state or a flush pending state, the flush read instruction is issued.

With the novel memory flush technique described above, a single memory flush command from a process will cause flush read instructions to be issued for multiple memory targets and cause all necessary memory targets to be flushed. The memory targets may be local to the process issuing the memory flush command, or they may be non-local. Also, by the use of a flush state machine, the number of flush reads that are actually processed is significantly reduced.

The flush state machine is also very memory efficient in that it only maintains three states and the transition logic of the flush state machine is the same for all memory targets. Furthermore, only one flush state machine is required to be maintained per memory target, because it is globally used by all processes requesting a memory flush of that memory target. Therefore, the memory flush technique according to embodiments of the present invention is simple, does not require too much hardware overhead, and robustly and transparently handles memory flushes so that it may be applicable to distributed shared memory environments having multiple memory targets, multiple memory types and multiple instances of memory types.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
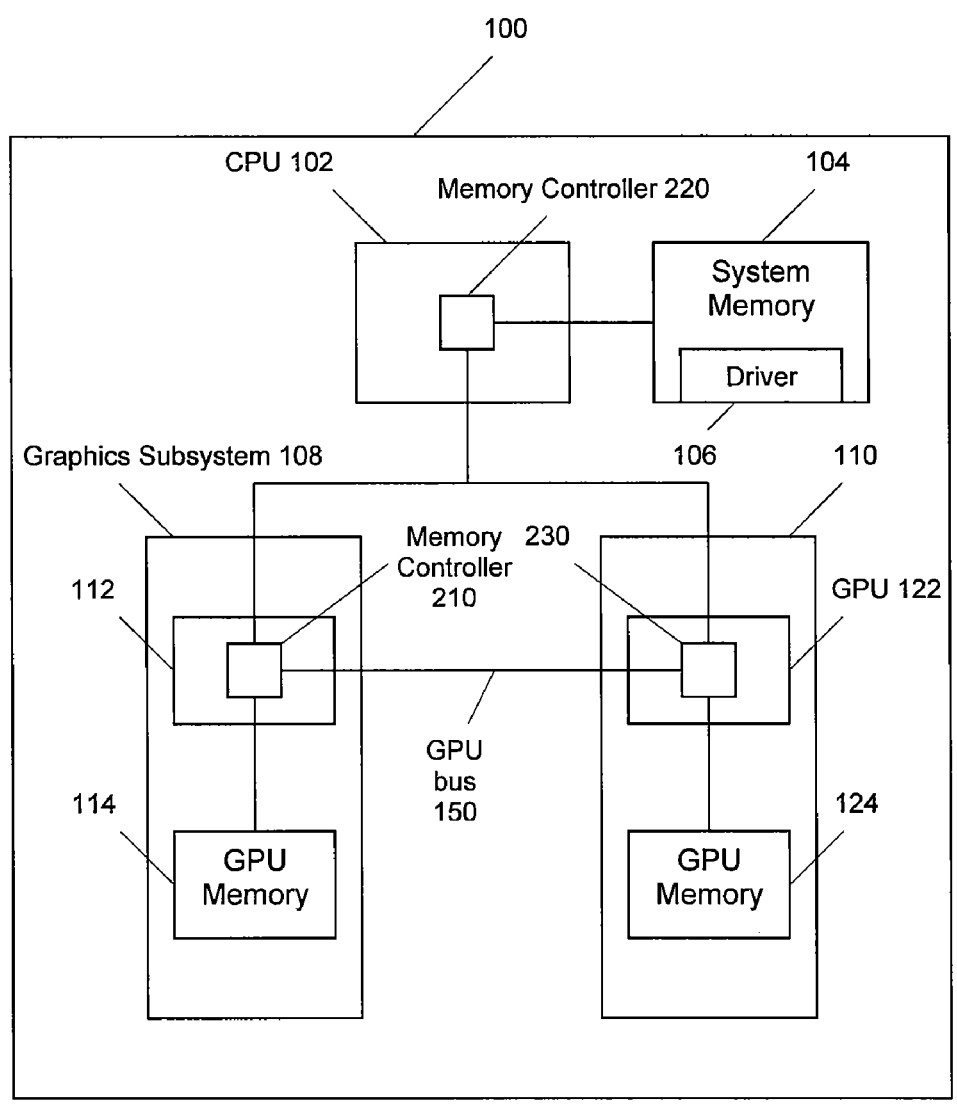
FIG. 2 is a block diagram of one embodiment of a computing device in which the present invention can be implemented.

FIG. 2 is a block diagram of one embodiment of a computing device in which the present invention can be implemented. The computing device 100 includes a central processing unit (CPU) 102, a system memory 104, a first graphics subsystem 108 and a second graphics subsystem 110. The CPU 102 is coupled to the first and second graphic subsystems 108, 110 and the system memory 104, which is used to store data and programs, such as a driver 106 for the first and second graphic subsystems 108, 110, through a controller 220. The first graphics subsystem 108 includes a first graphics processing unit (GPU) 112 coupled to a first GPU memory 114. The second graphics subsystem 110 includes a second GPU 122 and a second GPU memory 124. The first GPU 112 is coupled to the second GPU 122 by a GPU bus 150.

Figure 1:
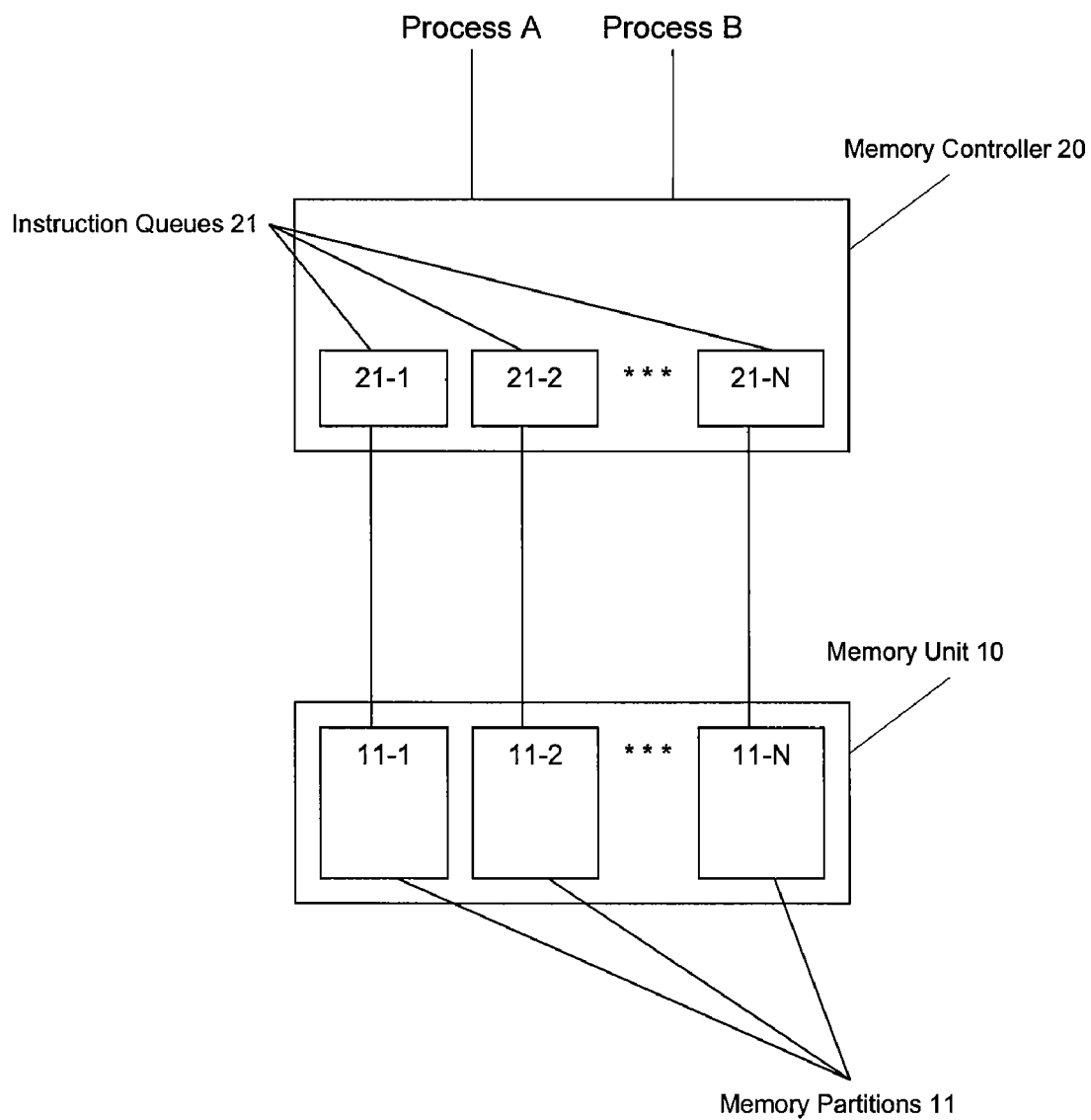
FIG. 1 illustrates a conventional shared memory environment.

The computing device 100 is configured as a distributed shared memory system. In such a distributed shared memory system, the GPU 112 has access to its local memory (the GPU memory 114), a memory that is local to the CPU 102 (the system memory 104), and a memory that is local to its peer GPU (the GPU memory 124 of the GPU 122). The memory accesses are controlled through the use of memory controllers 210, 230 and the controller 220. The memory controller 210 controls access to the GPU memory 114. The controller 220 controls access to the system memory 104. The memory controller 230 controls access to the GPU memory 124. Peer-to-peer memory access is made directly between the memory controllers 210, 230 without going through the controller 220. The memory controllers 210, 230 are shown in FIG. 1 as integrated with their respective processing units 112, 122. In alternative embodiments, they may be provided as discrete components.

In addition, the computing device in which the present invention can be implemented may be embodied in different ways. The present invention can be implemented and practiced in a computing device as long as the computing device includes at least two processing units and local memory associated with each of the processing units that is shared among the processing units. For example, the present invention is applicable to a computing device having a CPU, associated system memory, and one or more graphics subsystems, each including a GPU and a GPU memory. As another example, the present invention is applicable to a multi-CPU computing device where each of the CPUs has an associated memory that is shared among the multiple CPUs. In another embodiment, there may be multiple CPUs and one or more GPUs.

Figure 3:
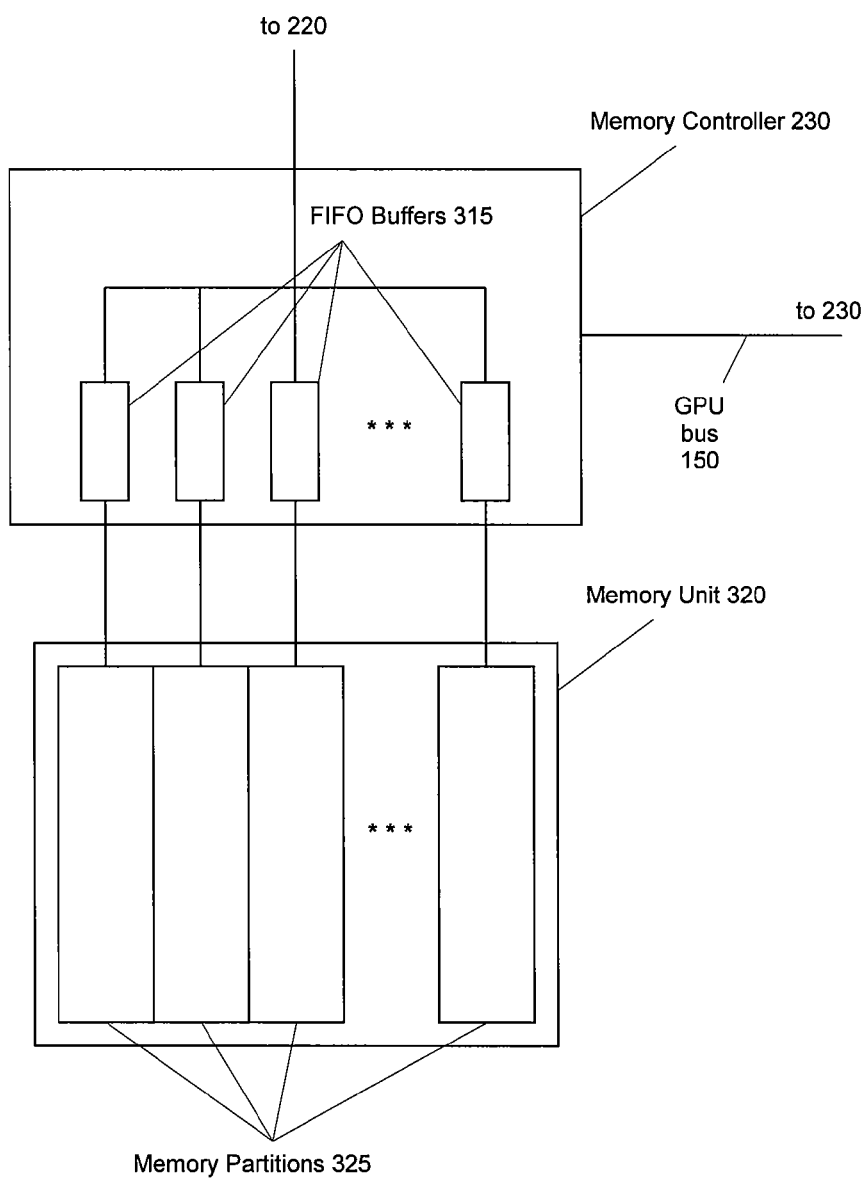
FIG. 3 illustrates a memory subsystem of a graphics subsystem in additional detail.

FIG. 3 illustrates a memory subsystem of the graphics subsystem 108 in additional detail. The memory subsystem illustrated in FIG. 3 is also representative includes a plurality of first-in, first-out (FIFO) buffers 315 that function as instruction queues, and the memory unit 320 has a plurality of memory partitions 325. Each of the FIFO buffers 315 has a separate coupling to one of the memory partitions 325. The memory controller 310 uses the FIFO buffers 315 to queue memory access instructions that it receives from processes running on its corresponding GPU and memory access instructions that it receives from processes running on a peer GPU through the memory controller of the peer GPU.

The memory access instructions that are queued in the FIFO buffers 315 by the memory controller 310 include a write instruction, a read instruction, and a flush read instruction. A flush read instruction is a special type of a read instruction. An ordinary read instruction includes a memory address from which data is read out. In response to the read instruction, the memory controller 310 returns the data that is read out from the memory address. A flush read instruction, on the other hand, does not cause data to be read from memory because a flush read includes an invalid memory address in the memory address field. When a flush read is processed, a specially tagged data, instead of data that is read from memory, is returned as the read result.

Typically, a memory flush is requested by the process that issued a write instruction, directly following the write instruction. The memory flush request followed by the return of the specially tagged data as the read result ensures that the previously issued write instruction has completed and data written pursuant to such an instruction can be read by other processes. Otherwise, there is a risk that data might be read from memory before such data is completely written out to memory.

According to various embodiments of the present invention, when a memory flush is requested by a process following a write instruction, the memory controller associated with the GPU on which the process is running issues a flush read instruction to memory partitions of its local memory and a flush read instruction to memory controllers to which it is coupled. For example, in the computing device 100, if a process running on the GPU 112 requests a memory flush following a write instruction, the memory controller 210, in response thereto, will issue flush read instructions to memory partitions of the GPU memory 114 and to the controller 220 and the memory controller 230. Each of the controller 220 and the memory controller 230 will then process the flush read request locally and, upon completion, return an aggregate response to the memory controller 210 indicating that the flush read has completed.

When a memory flush is requested by a process, all memory partitions may become a target for flush reads because, in a distributed shared memory system, data may be written to any one of the memory partitions. The flush read instruction, however, is not issued to all memory partitions. For example, if a memory partition has not been written to, the flush read instruction is not processed for that memory partition. Also, if a memory partition has been written to, but a flush read has already been completed for that memory partition, this signifies that no write is pending and the flush read instruction is not processed for that memory partition. As a way to keep track of the flush processing states of the memory partitions, a flush state machine is maintained for each memory partition by the memory controller that is locally coupled to the memory partition.

Figure 4:
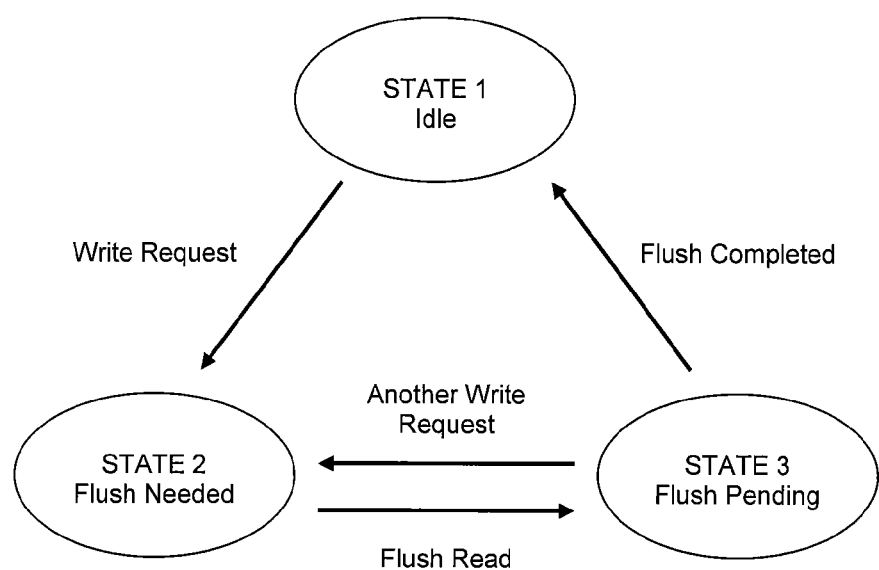
FIG. 4 is a schematic diagram that illustrates the transition logic of flush state machines maintained by the memory controllers of FIG. 2.

FIG. 4 is a schematic diagram of a flush state machine that illustrates the transitions between the different flush states of a memory partition. State 1 is the idle state. It represents the default state of the memory partition. When a write to the memory partition is requested while the memory partition is in State 1, the state of the memory partition transitions to State 2, the flush needed state. When a flush read instruction is issued for the memory partition while the memory partition is in State 2, the state of the memory partition transitions to State 3, the flush pending state. When a flush read completes while the memory partition is in State 3, the state of the memory partition returns to State 1. On the other hand, when a write to the memory partition is requested while the memory partition is in State 3, the state of the memory partition returns to State 2.

The flush processing state of a memory partition is examined before a corresponding memory controller decides whether to issue a flush read instruction for that memory partition. If the memory partition is in State 1, the flush read instruction is not issued. On the other hand, if the memory partition is in State 2 or State 3, the flush read instruction is issued and the memory controller waits for the flush read result to be returned in response thereto.

Figure 5:
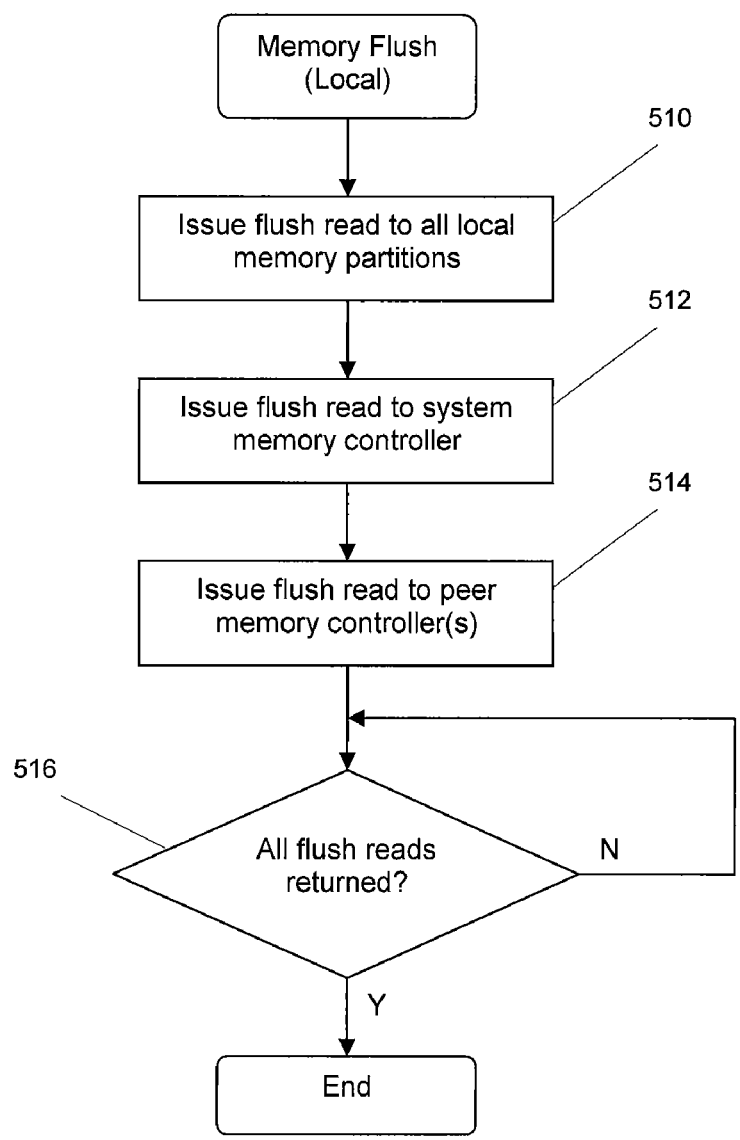
FIG. 5 is a flow diagram that illustrates the operation of a memory controller in response to a flush read instruction issued by a local client process.

FIG. 5 is a flow diagram that illustrates the operation of a memory controller in response to memory flush requested by a local client process. In step 510, the memory controller issues flush read instructions to all of its local memory partitions. In other words, the flush read instructions are queued in the FIFO buffers corresponding to the local memory partitions. In an alternative embodiment, the flush state machine of the local memory partitions may be examined to determine whether or not a flush read is necessary before issuing one. In such a case, if the flush processing state of any of the memory partitions is in State 1, the flush read instruction is not issued to such memory partition.

Figure 6:
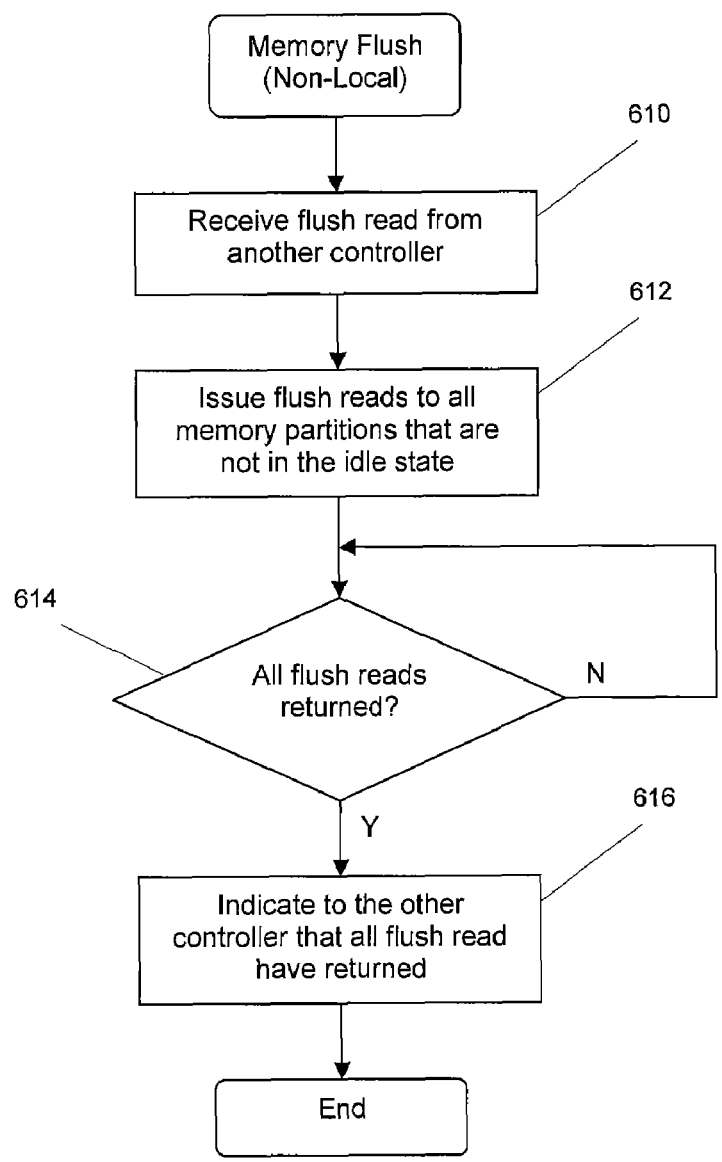
FIG. 6 is a flow diagram that illustrates the operation of a memory controller in response to a flush read instruction issued by another memory controller.

Subsequently, the flush read instruction is issued to the system memory controller (step 512) and to the memory controllers of the peer GPUs (step 514). The steps carried out by the system memory controller and the memory controllers of the peer GPUs are illustrated in FIG. 6. When it is determined in step 516 that the results of all flush reads have returned (from the local memory partitions, the system memory controller, and the memory controllers of peer GPUs), the process ends, and the data written by the local process prior to the memory flush request is free to be read by other processes.

FIG. 6 is a flow diagram that illustrates the operation of a memory controller in response to a flush read instruction issued by another memory controller. In step 610, the flush read instruction from another memory controller is received. Then, the memory controller examines the flush processing states of its local memory partitions and issues flush read instructions to those that are not in State 1 (step 612). During flush read of the system memory, both a flush read that snoops the processor's cache and a flush read that does not snoop the processor's cache are issued. During flush read of GPU memory, only one type of flush read, one that does not snoop the processor's cache, is issued. When it is determined in step 614 that the results of the flush reads are returned by all memory partitions to which the flush read instructions were issued, the memory controller indicates to the other memory controller that memory flush of its local memory partitions has been completed (step 616).

While the foregoing is directed to embodiments of the present invention, other and further embodiments of the invention may be devised without departing from the basic scope thereof, and the scope thereof is determined by the claims that follow.

What is claimed is:

1. In a memory system having multiple memory regions, a method of determining that a write operation has completed, the method comprising the steps of:
    issuing a read instruction following a write instruction;
    maintaining a state variable for each of the memory regions;
    determining the memory regions for which the read instruction will be processed based in part on the values of the state variables for the memory regions;
    processing the read instructions in accordance with the determining step; and
    determining that a write operation based on the write instruction has completed when read results of all processed read instructions are returned.

2. The method according to claim 1, wherein the read instruction comprises a flush read instruction.

3. The method according to claim 1, wherein the read instruction for a memory region is not to be processed if the state variable for said memory region is at its default value.

4. The method according to claim 3, wherein the state variable for said memory region returns to its default value when the read instruction is processed for said memory region and a corresponding read result is returned.

5. The method according to claim 3, wherein the state variable for said memory region transitions to a non-default value when another write instruction is processed for said memory region.

6. The method according to claim 1, wherein the multiple memory regions comprise local memory regions and non-local memory regions, and the read instructions for the non-local memory regions are processed in accordance with the determining step.

7. In a memory system having multiple memory regions, a method of tracking a state of a memory region, the method comprising the steps of:
    maintaining a state variable for the memory region;
    if the state variable is at a default value, changing the value of the state variable to a first value when a write instruction is processed for said memory region;
    if the state variable is at the first value, changing the value of the state variable to a second value when a flush read instruction is processed for said memory region; and
    if the state variable is at the second value, changing the value of the state variable to the default value when the flush read instruction has finished processing, or changing the value of the state variable to the first value when a write instruction is processed for said memory region.

8. The method according to claim 7, wherein the state of each of the memory regions are tracked by maintaining a separate state variable for each of the memory regions.

9. The method according to claim 8, wherein, for each memory region:
    if the state variable is at a default value, changing the value of the state variable to a first value when a write instruction is processed for said memory region;
    if the state variable is at the first value, changing the value of the state variable to a second value when a flush read instruction is processed for said memory region; and
    if the state variable is at the second value, changing the value of the state variable to the default value when the flush read instruction has finished processing, or changing the value of the state variable to the first value when a write instruction is processed for said memory region.

10. The method according to claim 7, wherein a predefined tag value is returned when the flush read instruction has finished processing.

11. A distributed memory system, comprising:
    a first memory controller for a first group of memory regions; and
    a second memory controller for a second group of memory regions,
    wherein the first memory controller is responsive to a local memory flush command to issue flush read instructions for memory regions in the first group and to the second memory controller, and wherein the second memory controller is responsive to the flush read instruction issued by the first memory controller to issue flush read instructions for memory regions in the second group based in part on the value of a state variable maintained for each memory region in the second group.

12. The distributed memory system according to claim 11, wherein the second memory controller is responsive to the flush read instruction issued by the first memory controller to issue flush read instructions for selected memory regions in the second group.

13. The distributed memory system according to claim 12, wherein the selected memory regions in the second group comprise the memory regions in the second group whose state variables are not at a default value.

14. The distributed memory system according to claim 13, wherein the second memory controller issues a flush completion signal to the first memory controller when the flush read instructions for selected memory regions in the second group have completed processing.

15. The distributed memory system according to claim 14, wherein the first memory controller indicates completion of the memory flush when the flush read instructions for the memory regions in the first group have completed processing and it receives a flush completion signal from the second memory controller.

16. The distributed memory system according to claim 11, further comprising a third memory controller for a third group of memory regions, wherein the first memory controller is responsive to the memory flush request to also issue a flush read instruction to the third memory controller, and the third memory controller is responsive to the flush read instruction issued by the first memory controller to issue flush read instructions for memory regions in the third group.

17. The distributed memory system according to claim 16, wherein the second memory controller is responsive to the flush read instruction issued by the first memory controller to issue flush read instructions for selected memory regions in the second group, and the third memory controller is responsive to the flush read instruction issued by the first memory controller to issue flush read instructions for selected memory regions in the third group.

18. The distributed memory system according to claim 17, wherein the second memory controller maintains a state variable for each of the memory regions in the second group and the third memory controller maintains a state variable for each of the memory regions in the third group, and wherein the selected memory regions in the second group comprise the memory regions in the second group whose state variables are not at a default value and the selected memory regions in the third group comprise the memory regions in the third group whose state variables are not at a default value.

19. The distributed memory system according to claim 16, wherein the first group of memory regions is local to a first graphics processing unit (GPU) and the second group of memory regions is local to a second GPU, and the third group of memory regions comprises system memory.

* * * * *